United States Patent [19]

Sevic

[11] Patent Number: 5,893,337
[45] Date of Patent: Apr. 13, 1999

[54] PROCESS FOR OPTIMIZING THE GROWTH OF FISH BY CONTROLLED INJECTION OF OXYGEN

[75] Inventor: Bohumil Sevic, Saint Urbin, France

[73] Assignee: L'Air Liquide, Societe Anonyme pour l'Etude et l'Exploitation des Procedes Georges Claude, Paris, France

[21] Appl. No.: 08/826,758

[22] Filed: Mar. 24, 1997

[30] Foreign Application Priority Data

Mar. 22, 1996 [FR] France ..................... 96 03633

[51] Int. Cl.⁶ .................... A01K 61/00; A01K 63/04
[52] U.S. Cl. .................... 119/215; 119/230; 119/231
[58] Field of Search .................... 119/215, 231, 119/230, 226, 227, 228, 263, 261, 200

[56] References Cited

U.S. PATENT DOCUMENTS

| | | | |
|---|---|---|---|
| 3,320,928 | 5/1967 | Smith | 119/3 |
| 3,805,224 | 4/1974 | Wenz | 340/3 R |
| 4,052,960 | 10/1977 | Birkbeck et al. | 119/3 |
| 4,101,608 | 7/1978 | Bracey | 261/36 R |
| 4,116,164 | 9/1978 | Shabi et al. | 119/3 |
| 4,182,268 | 1/1980 | Berger | 119/3 |
| 4,198,926 | 4/1980 | Morse | 119/4 |
| 4,441,452 | 4/1984 | Strain, Jr. | 119/3 |
| 4,488,508 | 12/1984 | Heideman | 119/3 |
| 4,654,147 | 3/1987 | Bagley | 210/744 |
| 4,765,807 | 8/1988 | Henriksen | 55/51 |
| 4,819,581 | 4/1989 | Lakey, Sr. | 119/3 |
| 4,972,801 | 11/1990 | Hunt | 119/3 |
| 5,133,287 | 7/1992 | Hicks | 119/3 |
| 5,695,635 | 12/1997 | Sasaki et al. | 210/188 |

FOREIGN PATENT DOCUMENTS

| | | |
|---|---|---|
| 3428701 | 2/1986 | Germany. |
| 3294721 | 12/1988 | Japan. |
| 2171128 | 7/1990 | Japan. |
| 2 173 981 | 10/1986 | United Kingdom. |
| 94/02006 | 2/1994 | WIPO. |

Primary Examiner—Michael J. Carone
Assistant Examiner—James S. Bergin
Attorney, Agent, or Firm—Burns, Doane, Swecker & Mathis, L.L.P.

[57] ABSTRACT

A process for optimizing the growth of fish reared in a pond, comprising injecting oxygen into the pond in a controlled quantity according to different cycles.

14 Claims, No Drawings

PROCESS FOR OPTIMIZING THE GROWTH OF FISH BY CONTROLLED INJECTION OF OXYGEN

BACKGROUND OF THE INVENTION:

(i) Field of the Invention

The present invention relates to a process for optimizing the growth of fish reared in a pond.

(ii) Description of Related Art

In aquacultural farming, oxygen, feed and water are three essential factors. Furthermore, the availability of oxygen directly influences the performances of the fish farming. To cover the basic physiological requirements of the fish (maintenance, movement and the like) but also to provide for the growth of this fish, the latter uses the energy obtained by the oxidation of the feeds, by virtue of the oxygen dissolved in the water. This concentration of oxygen dissolved in the water varies according to various parameters and it is important to remain above the critical oxygen concentration threshold at the limit of which the fish has a reduced metabolic activity and exhibits respiratory insufficiencies. Below this threshold, the lethal threshold, that is to say the death of the fish, is rapidly reached.

Whereas a liter of air contains about 300 mg of oxygen, a liter of fresh water at saturation contains about 30 times less, that is to say about 10 mg. This concentration varies according to the source of the water (sea water, fresh water, stagnant water, underground water, river water and the like), the temperature of the water (an increase in temperature reduces the concentration of dissolved oxygen at saturation), and the presence of organisms in this water (algae or plants, which produce or which consume oxygen). To these different factors, there should be added the density of the fish in water, knowing that in intensive farming, the density of fish is high and that the latter therefore rapidly depletes the resources of the medium.

SUMMARY AND OBJECTS OF THE INVENTION

The invention makes it possible to solve the disadvantages mentioned above. With this aim in view, in the process according to the invention, oxygen is injected into the pond for fish farming in a controlled quantity according to different successive cycles.

Preferably, more oxygen will be injected during the day than at night.

According to a preferred embodiment of the invention, more oxygen will be injected during the meals than during the rest of the day.

DETAILED DESCRIPTION OF PREFERRED EMBODIMENTS

Indeed, it has been observed that the oxygen consumption by the fish varied according to the times of the day or night but also varied depending on whether the fish was having a meal or otherwise. In a characteristic manner, it is observed that there is an oxygen consumption of about 150 g per ton of fish and per hour at night, about 200 g per ton of fish and per hour during the day, and about 450 g per ton of fish and per hour during meals. Thus, during the meals, the oxygen consumption by the fish more than doubles compared with its normal consumption during the day, it being possible for this to be explained especially by the very high agitation of the fish as soon as the process linked to the fish's meal is triggered. Traditionally, the consumption of oxygen by fish is compensated for by the diffusion from the surrounding air.

In order to be able to better respond to this variable oxygen requirement by fish in aquaculture ponds, the invention consists in injecting oxygen according to certain predetermined cycles by various means described below into the water and maintaining or generating a quantity of dissolved oxygen in this water which is sufficient to meet the needs of said fish. According to the invention, oxygen is injected into the pond water, preferably upstream thereof, so as to maintain an oxygen concentration in the water entering into the pond preferably of between 10 mg and 25 mg of dissolved oxygen per liter of water. Preferably, the injection of oxygen into the water is made in a sufficient quantity to maintain more than 5 mg of dissolved oxygen at the outlet of the pond and preferably from 5 to 7 mg of dissolved oxygen.

A first means of injecting oxygen into the water consists in using a device well known per se, called bicone, whose geometry makes it possible to maintain an equilibrium between the ascending speed of the oxygen bubbles and the descending hydraulic flow. The principle of transfer of this bicone allows high dissolution yields greater than or equal to 90%. This bicone system is immersed in the water and the oxygen injected through the cones.

A second well-known means for injecting oxygen into water consists in using oxygenators such as those known for example under the trade name AQUAVI (registered trade mark), a system which makes it possible to obtain about 500% oxygen saturation, and which operates at a pressure of the order of 1.2 to 1.5 bar.

Other known means for injecting oxygen into water also exist, such as the jet platforms, the oxygen diffusers placed at the bottom of the ponds, and the like.

Moreover, the aquacultural productivity is closely linked to the hydrobiological quality of the medium, defined by its physical, chemical and biological parameters. Thus, according to a preferred variant embodiment of the invention, ozone created on site by means of an ozonizer, well known per se, is also dissolved in the water. Oxygen is injected through the ozonizer, with about 3 to 15% of the oxygen being converted to ozone, the remainder of the oxygen injected with the ozone into the water being used as described above. The ozone injected into the water reacts with the organic matter so as to oxidize it rapidly. The contact time is thus limited to a few minutes and allows the elimination of the viruses and the bacteria present in the water. The quantity of ozone to be injected into the pond may vary according to the degree of contamination of said pond and is generally between about 0.5 and 2 g per cubic meter of water. It is thus possible to treat all the storage fishponds, to disinfect the water in hatcheries, to purify shellfish, and the like.

Preferably, an oxygen injection will be used which comprises a system for regulating the injection of this oxygen which thereby makes it possible to anticipate and/or compensate for the oxygen shortages which exist before or during the fish meals and to preferably maintain the quantities of dissolved oxygen in the water at values as described above. Thus, if an excessively low oxygen threshold is detected before the expected time of the fish meals, it will be possible to start a more substantial injection of oxygen even before said fish start feeding. It is also possible to inject, by means of this regulation, quantities of oxygen which are not always the same during different meals, in particular when the quantity of feedingstuff given during these meals is different depending on the meal. Thus, a higher quantity of oxygen may be injected just before or during or after the first meal of the day or on the contrary slightly less oxygen may be injected just before or during or just after the last meal of the day. Thus, by adapting the oxygen supplies as a function of the mealtimes and as a function of the meals themselves, a reduction in the conversion ratio and a better sanitary state are obtained for the fish population. Preferably, the flow rate of oxygen in the pond will be increased, at most 2 hours before the start of the fish meal, more preferably of each fish meal. In general, this increase will be preferably started half an hour to 1 hour before the meal or each meal. This high flow rate will be maintained during the meal(s) and optionally after the meals, in general not more than 1 hour after the start of each meal. This increase in injected oxygen may also take place when the temperature of the water exceeds a predetermined value, which is variable according to the type of fish.

In general, the increase in oxygen flow rate before the meals, during and after, will be preferably at least 20% by volume.

In order to regulate the oxygen in the pond, it is possible to use a regulation linked to a plurality of sensors such as dissolved oxygen sensors which make it possible to provide the choice and the maintenance of oxygen concentrations at the inlet and/or at the outlet of the pond and/or optionally at other sites of the pond and to thus vary the oxygen concentration and to vary the quantity of oxygen injected according to its point of injection, in particular within the limits described above. For the use of target points set by the user and which may vary according to the time of the day or according to the days or according to the size or the growth of the fish, said regulation makes it possible to comply with the expected oxygen injection for an expected dissolved oxygen concentration. In addition, on farms having a plurality of ponds, said ponds can thus be managed independently.

A system of regulation also allows the remote transmission of an alarm (for example, very close to the lethal dissolved oxygen concentration threshold in a pond), the consultation and the modification of data from a distance using a modem and telephone transmission of this information which may thus be visualized on a screen at a distance. It is also possible, by virtue of this control and regulating system, to acquire data such as quantity of oxygen injected, frequency of the meals, variations of the quantities injected, and the like, and to thereby obtain the graphical monitoring of the variations of the different parameters on a computer screen. As a general rule, the information collected the day before will be used to program the target values of the oxygen flow rates for the following days as a function of the time and it will be checked, by measurement of dissolved oxygen at the outlet of the ponds, for example, that the injected quantities are adequate.

The oxygen necessary for carrying out the process according to the invention may be either produced on site when the breeder's requirements are such that they justify the installation of a small factory on site, such as a factory using adsorption techniques (VSA and PSA, that is to say Vacuum Switch Adsorption and Pressure Swing Adsorption, respectively), this on-site factory producing a gas containing more than about 90% by vol. Of oxygen. Preferably, the oxygen is however stored on site in a reservoir in the form of liquid oxygen and is generally delivered by tanker to the breeder's site.

The regulating system provided for in the process according to the invention also allows, by virtue of a link such as a telephone link at a distance via modems, monitoring of the gas level in the liquid oxygen storage reservoir(s), a probe triggering an alarm signal when the liquid level goes below the chosen target level, which automatically triggers a signal, sent over the transmission line, for example a telephone line, to a central unit for managing the oxygen supply, for example, an oxygen production plant, so as to trigger a delivery order via a truck within the shortest possible time. This control system also allows a real-time consultation of the parameters relating to the gas installation on the breeder's site such as gas flow rate, pressure in the reservoir distribution network until the time of use, and the like.

According to another variant embodiment of the invention, the oxygen injected into the ponds is also used for the degradation of organic and nitrogenous wastes, as well as for the degradation of feeds not consumed by the fish. By way of nonlimiting example, for fish of the Salmonidae type, it is necessary to use about 200 to 220 g of oxygen to allow the assimilation of about 1 kg of feed by the fish, and it is necessary to provide about 1 kg of oxygen, or even more, to degrade, by oxidation, one kilo of unconsumed feed.

I claim:

1. A process for optimizing the growth of fish reared in a pond, comprising injecting oxygen into the pond in a controlled quantity before feeding the fish, with the injection of oxygen being increased at most two hours before a fish meal begins.

2. The process as claimed in claim 1, wherein more oxygen is injected during the day than at night.

3. The process as claimed in claim 1, further comprising injecting ozone into the pond.

4. The process as claimed in claim 3, wherein the ozone and the oxygen are produced from the same source of oxygen, comprising converting from 3 to 15% oxygen to ozone before injecting a combination of oxygen and ozone into the pond.

5. The process as claimed in claim 1, comprising producing the oxygen injected into the pond on site by means of an adsorption unit which produces oxygen comprising at least 90% oxygen from ambient air.

6. The process as claimed in claim 1, comprising delivering the oxygen on site, storing the oxygen in a liquid storage in liquid form, and then injecting the stored oxygen into the pond from the liquid storage.

7. The process as claimed in claim 1, comprising feeding water from upstream of the pond into the pond and injecting the oxygen in water upstream of the pond so as to have a dissolved oxygen concentration per liter of water entering into the pond of between 10 mg and 25 mg.

8. The process as claimed in claim 1, comprising injecting oxygen into the water in a sufficient quantity to maintain more than about 5 mg of dissolved oxygen in the water at an outlet of the pond.

9. The process as claimed in claim 8, wherein between 5 and 7 mg of dissolved oxygen are maintained in the water at said outlet of the pond.

10. The process as claimed in claim 1, comprising maintaining the increased oxygen injected until the fish receive their meal.

11. The process as claimed in claim 1, comprising maintaining the increased oxygen injected during this fish meal.

12. The process as claimed in claim 11, wherein the increased injected oxygen is maintained after an end of the meal.

13. The process as claimed in claim 1 wherein the oxygen injected is increased half an hour to one hour before the meal begins.

14. A process for optimizing the growth of fish reared in a pond, comprising injecting oxygen and ozone into the pond in a controlled quantity before feeding the fish, with the ozone and oxygen being produced from the same source of oxygen, by converting from 3 to 15 percent oxygen to ozone before injecting a combination of the oxygen and ozone into the pond.

* * * * *